US012469896B2

(12) United States Patent
Takshi et al.

(10) Patent No.: US 12,469,896 B2
(45) Date of Patent: Nov. 11, 2025

(54) SMART THERMAL MANAGEMENT SYSTEM TO PREVENT THERMAL RUNAWAY IN RECHARGEABLE BATTERIES (71) Applicants: UNIVERSITY OF SOUTH FLORIDA, Tampa, FL (US); POLYMATERIALS APP LLC, Tampa, FL (US)

(72) Inventors: Arash Takshi, Tampa, FL (US); Manoj Kumar Ram, Tampa, FL (US)

(73) Assignees: UNIVERSITY OF SOUTH FLORIDA, Tampa, FL (US); POLYMATERIALS APP LLC, Tampa, FL (US)

( * ) Notice: Subject to any disclaimer, the term of this patent is extended or adjusted under 35 U.S.C. 154(b) by 514 days.

(21) Appl. No.: 18/042,572

(22) PCT Filed: Aug. 25, 2021

(86) PCT No.: PCT/US2021/047454
§ 371 (c)(1),
(2) Date: Feb. 22, 2023

(87) PCT Pub. No.: WO2022/046841
PCT Pub. Date: Mar. 3, 2022

(65) Prior Publication Data
US 2023/0420766 A1 Dec. 28, 2023

Related U.S. Application Data (60) Provisional application No. 63/070,160, filed on Aug. 25, 2020.

(51) Int. Cl.
*H01M 10/633* (2014.01)
*H01M 10/42* (2006.01)
(Continued)

(52) U.S. Cl.
CPC ..... *H01M 10/633* (2015.04); *H01M 10/4264* (2013.01); *H01M 10/443* (2013.01);
(Continued)

(58) Field of Classification Search
CPC .......... H01M 10/651; H01M 10/4264; H01M 10/443; H01M 10/486; H01M 2010/4271
See application file for complete search history.

(56) References Cited

U.S. PATENT DOCUMENTS

2002/0014880 A1* 2/2002 McAndrews ........... H02J 9/061
320/134
2011/0298626 A1* 12/2011 Fechalos ............. H02J 7/00309
320/152

(Continued)

FOREIGN PATENT DOCUMENTS

| CN | 110137628 B | 11/2021 |
| WO | 2012125968 A1 | 9/2012 |
| WO | 2022/046841 A1 | 3/2022 |

OTHER PUBLICATIONS

The decision of SIPO to grant a Patent for Application CN 202180053196 (Year: 2024).*
(Continued)

Primary Examiner — Alexander Usyatinsky
(74) Attorney, Agent, or Firm — HUSCH BLACKWELL LLP (57) ABSTRACT A battery management system comprises: a circuit path electrically coupling a battery and a load; a backup storage device; a first switch connecting the battery and the backup storage device; a second switch connecting the backup storage device and the load; a sensor for measuring a temperature of the battery; and a controller in electrical communication with the first switch, the second switch, and the sensor. The controller executes a program to: (i) activate the first switch to connect the battery and the backup storage
(Continued)

device for charging the backup storage device for a charging period of time with power provided by the battery based on the temperature of the battery meeting a threshold, and (ii) activate the second switch to connect the backup storage device and the load for providing power to the load from the backup storage device after the charging period of time has expired.

47 Claims, 6 Drawing Sheets

(51) Int. Cl.
 H01M 10/44 (2006.01)
 H01M 10/48 (2006.01)
 H01M 10/651 (2014.01)
(52) U.S. Cl.
 CPC ....... *H01M 10/486* (2013.01); *H01M 10/651* (2015.04); *H01M 2010/4271* (2013.01)
(56) References Cited

U.S. PATENT DOCUMENTS

| | | | |
|---|---|---|---|
| 2014/0028321 A1 | 1/2014 | Bourgeois | |
| 2014/0339920 A1* | 11/2014 | Ingalls, Jr. | H02J 7/0013 324/426 |
| 2017/0025868 A1* | 1/2017 | Gravett | H02J 7/0031 |
| 2019/0280341 A1* | 9/2019 | Li | H02H 3/05 |
| 2022/0140413 A1* | 5/2022 | Whiteman | H01M 10/486 429/62 |

OTHER PUBLICATIONS

International Search Report of related PCT/US2021/047454, mailed Nov. 9, 2021, 2 pages.

Written Opinion of related PCT/US2021/047454, mailed Nov. 9, 2021, 11 pages.

Sreedhar, Sunil, Jason B. Siegel, and Saemin Choi. "Topology comparison for 48V battery-supercapacitor hybrid energy storage system." IFAC-PapersOnLine 50.1 (2017): pp. 4733-4738.

Bergveld, Henk Jan, et al. "Battery management systems." [BOOK] Springer Netherlands, 2002. 328 pages. [Sections provided upon request].

Shin, Donghwa, Massimo Poncino, and Enrico Macii. "Thermal management of batteries using supercapacitor hybrid architecture with idle period insertion strategy." IEEE Transactions on Very Large Scale Integration (VLSI) Systems 26.6 (2018): pp. 1159-1170.

Machine Translation of CN 110137628, (2021).

* cited by examiner

SMART THERMAL MANAGEMENT SYSTEM TO PREVENT THERMAL RUNAWAY IN RECHARGEABLE BATTERIES

CROSS-REFERENCES TO RELATED APPLICATIONS

This application is a 371 U.S. National Phase entry of International Application No. PCT/US2021/047454, filed Aug. 25, 2021, which claims the benefit of U.S. Provisional Patent Application No. 63/070,160, filed Aug. 25, 2020, each of which are incorporated herein by reference in their entirety for all purposes.

STATEMENT REGARDING FEDERALLY SPONSORED RESEARCH

Not Applicable.

BACKGROUND OF THE INVENTION

1. Field of the Invention

This invention relates to systems and methods for managing the temperature rise in batteries to avoid thermal runaway.

2. Description of the Related Art

The use of lithium batteries is increasing becoming the utmost power source of off-the-grid electrical systems. Lithium batteries have also gained attention for use in hybrid vehicles and grid applications due to the high energy density and voltage. The performance, efficiency and lifetime of a lithium battery are highly dependent on the state operating temperature. Thermal run away occurs in a lithium battery during a discharge process when an uncontrolled loop is formed between heat generation and temperature-rise, which causes a faster release of stored energy. This effect could lead to fires and explosions. The basic method to control thermal run away has been through the use of nonflammable electrolytes, less reactive electrode and operating condition. In fact, there are two main methods which have been adapted to control the thermal run away in batteries. The first method is heat source control and thermal resistance control. Under the heat source control method, the cooling device is used to remove heat through a convection process which itself consumes a large amount of the energy from battery or other source. The second method is the thermal resistance control, which cannot drop a sudden temperature rise in the battery.

What is needed is improved systems and methods for managing the temperature rise in batteries to avoid thermal runaway.

SUMMARY OF THE INVENTION

The foregoing needs are met by systems and methods for managing the temperature rise in batteries of the present disclosure.

In one aspect, the disclosure provides a battery management system comprising: a first circuit path electrically coupling a battery and a load; a backup storage device; a second circuit path electrically coupling the battery and the backup storage device; a first switch connected in the second circuit path between the battery and the backup storage device; a third circuit path electrically coupling the backup storage device and the load; a second switch connected in the third circuit path between the backup storage device and the load; a sensor for measuring a temperature of the battery; and a controller in electrical communication with the first switch, the second switch, and the sensor. The controller executes a program stored in the controller to: (i) activate the first switch to connect the battery and the backup storage device for charging the backup storage device for a charging period of time with power provided by the battery based at least in part on the temperature of the battery meeting a threshold, and (ii) activate the second switch to connect the backup storage device and the load for providing power to the load from the backup storage device after the charging period of time has expired.

In one embodiment of the battery management system, the backup storage device provides the power to the load in parallel with the battery when the second switch is activated. The backup storage device can comprise a supercapacitor. The backup storage device can comprise a rechargeable battery.

In one embodiment of the battery management system, the threshold comprises a temperature set point. The temperature set point can be less than a thermal runaway temperature for the battery. The temperature set point can be a percentage less than a thermal runaway temperature for the battery. The threshold can comprise a rate of temperature change. The rate of temperature change can be a predetermined rate of temperature change that causes a thermal runaway temperature for the battery.

In one embodiment of the battery management system, there is no switch in the first circuit path electrically coupling the battery and the load.

In one embodiment of the battery management system, the controller executes the program stored in the controller to deactivate the first switch to disconnect the battery and the backup storage device and to deactivate the second switch to disconnect the backup storage device and the load before charging the backup storage device for the charging period of time.

In one embodiment of the battery management system, the controller executes the program stored in the controller to deactivate the first switch to disconnect the battery and the backup storage device before activating the second switch to connect the backup storage device and the load.

In one embodiment of the battery management system, the controller executes the program stored in the controller to: (iii) deactivate the second switch to disconnect the backup storage device and the load after an energy delivery period of time.

In one embodiment of the battery management system, the controller executes the program stored in the controller to receive from a remote computing device the charging period of time and the energy delivery period of time.

In one embodiment of the battery management system, a first current from the battery during the charging period of time is higher than a second current from the battery during the energy delivery period of time.

In one embodiment of the battery management system, the controller executes the program stored in the controller to use a machine learning application to determine an optimal length of time for the charging period of time.

The battery management system may further comprise a DC-DC converter for converting a first voltage output from the battery management system to a second voltage provided to the load.

The battery management system may further comprise a DC-AC converter for receiving a DC voltage output from the battery management system and converting the DC voltage to an AC voltage provided to the load.

The battery management system may further comprise a sensor for measuring a state of charge in the battery.

The battery management system may further comprise a sensor for measuring a state of charge in the backup storage device.

In another aspect, the disclosure provides a battery management system comprising: a first circuit path electrically coupling a battery and a load; a backup storage device; a second circuit path electrically coupling the battery and the backup storage device; a first switch connected in the second circuit path between the battery and the backup storage device; a third circuit path electrically coupling the backup storage device and the load; a second switch connected in the third circuit path between the backup storage device and the load; a sensor for measuring a battery current in the first circuit path; and a controller in electrical communication with the first switch, the second switch, and the sensor. The controller executes a program stored in the controller to: (i) activate the first switch to connect the battery and the backup storage device for charging the backup storage device for a charging period of time with power provided by the battery based at least in part on the battery current meeting a threshold, and (ii) activate the second switch to connect the backup storage device and the load for providing power to the load from the backup storage device after the charging period of time has expired.

In one embodiment of the battery management system, the backup storage device provides the power to the load in parallel with the battery when the second switch is activated. The backup storage device can comprise a supercapacitor. The backup storage device can comprises a rechargeable battery.

In one embodiment of the battery management system, the controller executes the program stored in the controller to determine a temperature of the battery based on the battery current.

In one embodiment of the battery management system, the threshold corresponds to a temperature set point. The temperature set point can be less than a thermal runaway temperature for the battery. The temperature set point can be a percentage less than a thermal runaway temperature for the battery.

In one embodiment of the battery management system, there is no switch in the first circuit path electrically coupling the battery and the load.

In one embodiment of the battery management system, the controller executes the program stored in the controller to deactivate the first switch to disconnect the battery and the backup storage device and to deactivate the second switch to disconnect the backup storage device and the load before charging the backup storage device for the charging period of time.

In one embodiment of the battery management system, the controller executes the program stored in the controller to deactivate the first switch to disconnect the battery and the backup storage device before activating the second switch to connect the backup storage device and the load.

In one embodiment of the battery management system, the controller executes the program stored in the controller to: (iii) deactivate the second switch to disconnect the backup storage device and the load after an energy delivery period of time.

In one embodiment of the battery management system, the controller executes the program stored in the controller to receive from a remote computing device the charging period of time and the energy delivery period of time.

In one embodiment of the battery management system, a first current from the battery during the charging period of time is higher than a second current from the battery during the energy delivery period of time.

In one embodiment of the battery management system, the controller executes the program stored in the controller to use a machine learning application to determine an optimal length of time for the charging period of time.

The battery management system can further comprise a DC-DC converter for converting a first voltage output from the battery management system to a second voltage provided to the load.

The battery management system can further comprise a DC-AC converter for receiving a DC voltage output from the battery management system and converting the DC voltage to an AC voltage provided to the load.

The battery management system can further comprise a sensor for measuring a state of charge in the battery.

The battery management system can further comprise a sensor for measuring a state of charge in the backup storage device.

In another aspect, the disclosure provides a method for operating a battery management system. The method comprises: determining, via a controller, that a temperature of a battery has met a temperature threshold based at least in part on sensor data received from a sensor measuring a battery characteristic, wherein the battery provides power to a load; activating, via the controller, a charging cycle for a backup storage device based at least in part on the temperature of the battery meeting the temperature threshold, wherein the battery charges the backup storage device; determining, via the controller, that a first time period has expired for the charging cycle; and activating, via the controller, a delivery cycle in which the backup storage device provides power to the load in parallel to the battery with respect to the battery.

In one embodiment of the method, activating the charging cycle further comprises activating a circuit switch for the battery to provide power to the backup storage device.

In one embodiment of the method, the circuit switch is a first circuit switch, and activating the charging cycle further comprises deactivating a second circuit switch.

In one embodiment of the method, activating, via the controller, the delivery cycle in which the backup storage device provides power to the load in parallel to the battery further comprises deactivating the first circuit switch.

In one embodiment of the method, the sensor comprises a temperature sensor.

In one embodiment of the method, the sensor comprises a current sensor, and the battery characteristic is a battery current supplied by the battery.

In one embodiment of the method, the backup storage device comprises a rechargeable battery.

In one embodiment of the method, the backup storage device comprises a supercapacitor.

BRIEF DESCRIPTION OF DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION OF THE INVENTION

The present disclosure of the embodiments relates to systems and methods for managing the temperature rise in batteries to avoid thermal runaway by way of using a backup energy storage device such as a supercapacitor or a rechargeable battery. For example, the embodiments can be used particularly to prevent thermal runaway in lithium (Li) batteries and other suitable batteries.

According to one-non-limiting example of the embodiments, a system can include a backup storage (a supercapacitor or another battery) and a smart circuit to control the backup storage's charging and discharging cycles. The system can rely on a smart algorithm through which the required backup storage can be relatively small in size and mass compared to the main battery. In addition to being a compact solution, the smart control system ensures efficient usage of the backup storage to achieve high energy density in the system.

The mechanism of charge storage in Li batteries dictates the structure of the battery, especially the electrodes' structure. For efficient charge storage and long battery lifetime, the charging process can be critical; particularly the current density during the charging cycle has to be limited. Otherwise, the electrode structure would be damaged. Also, such damage can occur when a battery is overloaded or high current is taken from the battery for an extended period of time. While a damaged electrode can potentially be a hazard for the battery, the main reason for combustion of a battery is due to an effect called thermal runaway which can occur in the exothermic reaction of Li in the charging process. Thermal runaway is a process that starts when the battery's temperature reaches to a critical level ($T=T_{runaway}$). At that point, the battery temperature keeps increasing until the internal combustion damages the battery which may result in a battery explosion. To avoid thermal runaway, the dissipated power inside the battery has to be controlled before reaching the critical temperature. The typical thermal runaway temperature in Li batteries is 60° C. (140° F.) (see www.rutronik.com/article/detail/News/lithium-ion-batteries-how-can-thermal-runaway-be-prevented/).

A simple solution to avoid thermal runaway is to disconnect the battery from the charger or the load once its temperature is near the critical temperature. However, sudden disconnection of the battery is problematic for many applications such as electric vehicles, drones, military and medical devices. Since the temperature rise occurs through the heat dissipation generated by a high current passing through the internal resistance of the battery (Joule heat), today, a common approach to reduce the internal resistance is to use overdesigned batteries or batteries with special designs that include distributed electrodes. In both cases, the weight and size of the battery can be larger than what is actually needed for the application.

Figure 1A:
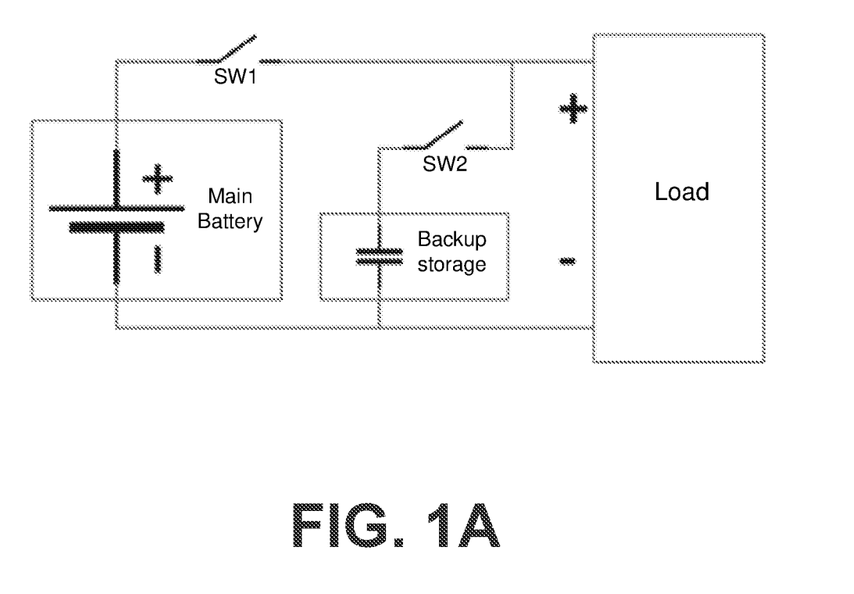
FIGS. 1A and 1B are schematic drawings of battery backup storage examples for a main battery running a DC load, according to one embodiment described herein.
Figure 1B:
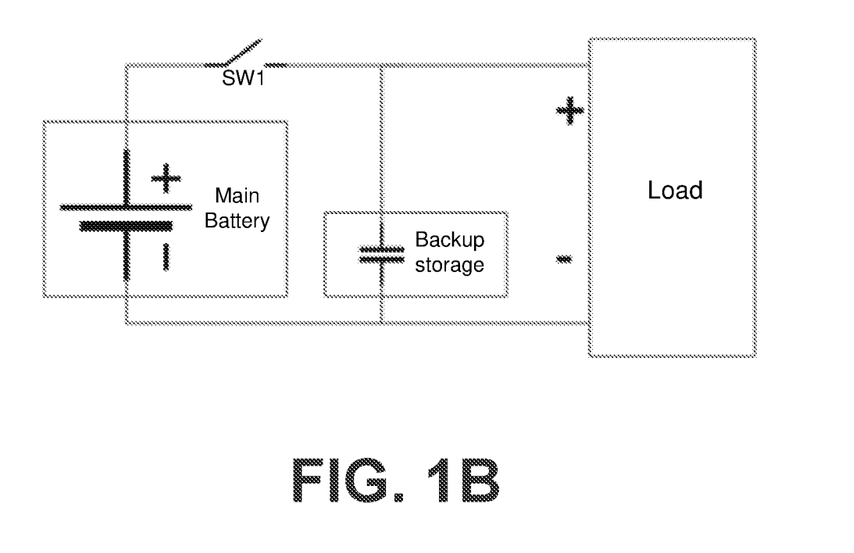

With reference to FIGS. 1A and 1B, shown are two battery topologies of a system for a direct current (DC) load. Although the use of a backup battery or a supercapacitor has been considered to avoid the power interruption when the main battery is cut off before the thermal runaway (DOI: 10.1109/TVLSI.2018.2818758), simply adding a backup storage can result in a significant increase in the weight and size of the energy storage. In this configuration, the main battery is temporarily cut off to be cooled down when the backup storage delivers the energy to the load. FIG. 1A is a first topology using a backup storage for the main battery running a DC load in an alternative mode. In the alternative mode, the system can have either SW1 or SW2 on at any an instance of time. FIG. 1B is a second topology using a backup storage for the main battery running with a backup storage as a buffer. In both FIG. 1A and FIG. 1B, SW1 will be in the open mode cutting off the battery from the circuit.

Figure 2:
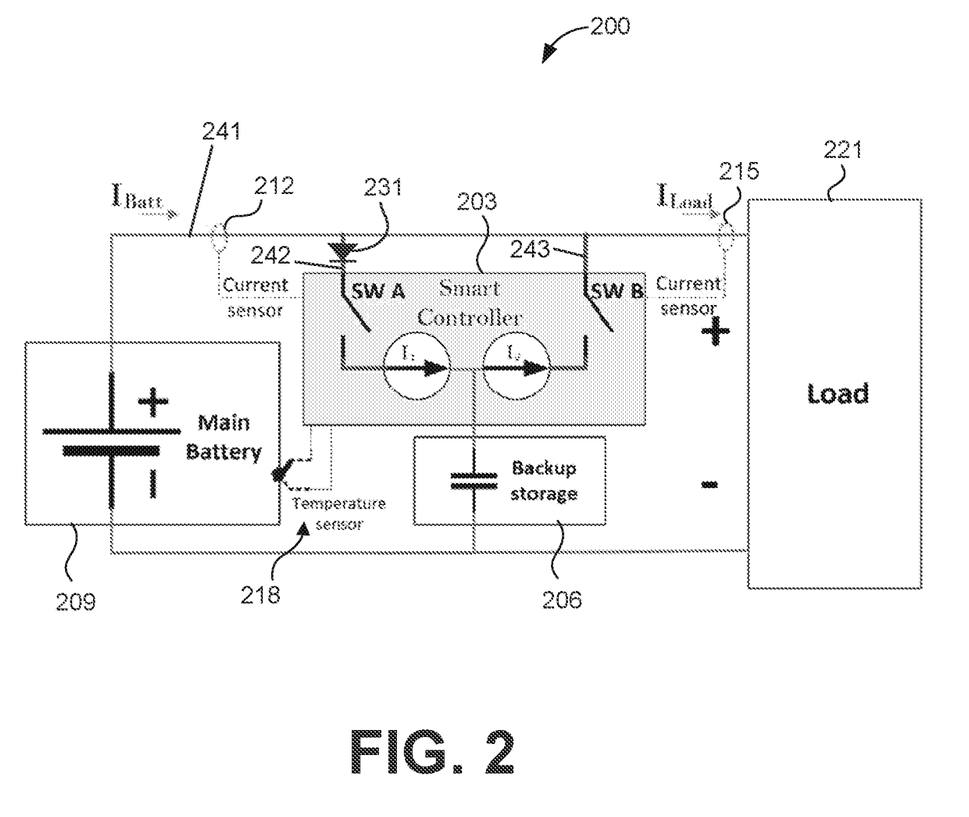
FIG. 2 is a schematic drawing of a battery management system, according to one embodiment described herein.

With reference to FIG. 2, shown is a schematic drawing of a battery management system 200. When a temperature threshold has been reached, the battery management system 200 can be configured to operate in a backup charging cycle and a backup energy delivery cycle. The battery management system 200 can include a controller 203 and a backup storage device 206. The controller 203 can represent a smart controller, a control system, smart control system and other suitable computing devices. The backup storage device 206 can represent a secondary battery storage source such as a small backup battery, a rechargeable battery, a supercapacitor, or other suitable battery storage device.

Additionally, the battery management system 200 includes a main battery 209, a first current sensor 212, a second current sensor 215, a temperature sensor 218, a load 221, a diode 231, a first circuit path 241 electrically coupling the battery 209 and the load 221, a second circuit path 242 electrically coupling the battery 209 and the backup storage device 206, a third circuit path 243 electrically coupling the backup storage device 206 and the load 221, a first switch SWA in the second circuit path 242, a second switch SWB in the third circuit path 243, and other suitable components. The circuit monitors the temperature of the main battery 209 directly or indirectly (through its output current). Once the temperature has reached a temperature set point or a temperature threshold, the controller 203 puts the backup storage device 206 in the circuit. The temperature set point may be determined based on the thermal runaway temperature for the main battery 209. For example, the temperature set point can be certain amount of degrees below the thermal runaway temperature or a percentage less than the thermal runaway temperature. In some cases, the thermal runaway temperature for a lithium ion battery can be in the range of 60 and 80° C. The thermal runaway temperature can vary based on various factors, such as the geometry and structure of the battery package or its electrodes. Additionally, the thermal runaway temperature can vary based on the battery chemistry.

In the illustrated circuit configuration, the controller 203 can configure the circuit for a first cycle for charging the backup storage device 206. In the first cycle (i.e., the backup charging cycle), the controller 203 has the first switch SWA turned On connecting the battery 209 and the backup storage device 206 in the second circuit path 242, and the second switch SWB turned Off disconnecting the backup storage device 206 and the load 221 in the third circuit path 243.

However, unlike the conventional backup systems, the main battery 209 can maintain an electrical connection to the circuit (there is no switch in the first circuit path 241 between the battery and the load). In fact, for a short period of time, the current from main battery may be increased to charge the backup storage device 206 while still powering the load 221. After a first time period has expired for the first cycle, this can be followed with second cycle in which the backup storage device 206 in parallel with the main battery 209 will deliver energy to the load 221, which can reduce the output current from the main battery 209. In the second cycle for the backup energy delivery, the controller 203 turns the first switch SWA turned Off disconnecting the battery 209 and the backup storage device 206 in the second circuit path 242, and the second switch SWB turned On connecting the backup storage device 206 and the load 221 in the third circuit path 243. Although in the first cycle the slope of the temperature rise will be higher due to the larger current from the main battery 209, the lower current in the second cycle will allow for a slower temperature rise or even drop of temperature. The smart algorithm (FIG. 3) implemented in the controller 203 will be able to control the cycles to avoid reaching the critical thermal runaway temperature.

Figure 3:
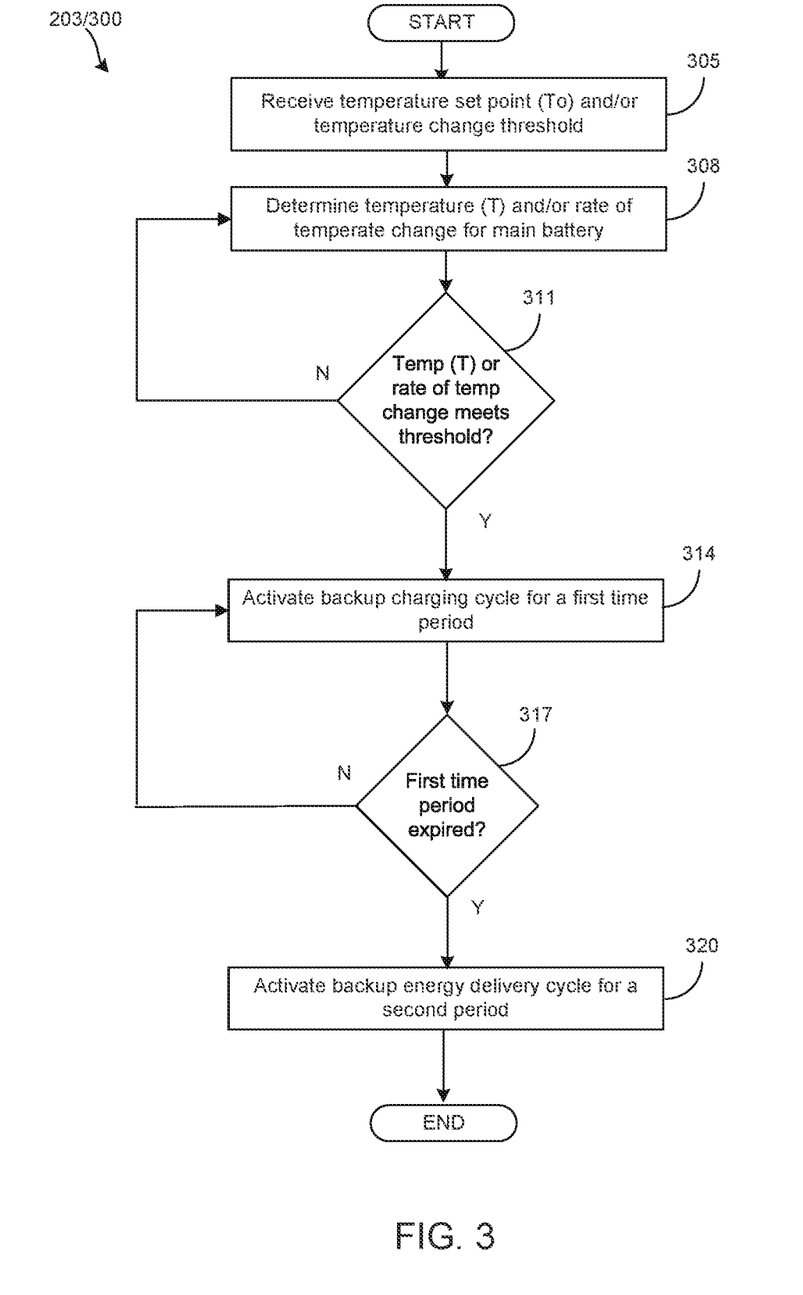
FIG. 3 is a flowchart illustrating one example of functionality implemented as portions of thermal management application executed in a controller of the battery management system of FIG. 2 according to various embodiments of the present disclosure.

Referring next to FIG. 3, shown is a flowchart that provides one example of the operation of a portion of a thermal management application 300 according to various embodiments. It is understood that the flowchart of FIG. 3 provides merely an example of the many different types of functional arrangements that may be employed to implement the operation of the portion of the thermal management application 300 as described herein. As an alternative, the flowchart of FIG. 3 may be viewed as depicting an example of elements of a method implemented in the controller 203 of the battery management system 200 (FIG. 2) according to one or more embodiments.

Beginning with box 305, the thermal management application 300 can receive a temperature set point $T_0$ and/or a temperature change threshold. The temperature set point $T_0$ can represent the battery temperature at which the controller 203 gets activated. The temperature set point $T_0$ is less than a runaway temperature for the main battery 209. The temperature change threshold can represent a rate of temperature change that causes a runaway temperature for the main battery 209.

Additionally, the battery management system 200 can be initially configured such that the first switch and the second switch are open or off. Further, the battery management system 200 can be configured to determine the optimal length of time for the backup charging cycle and the backup energy delivery cycle. In some examples, the battery management system 200 can use a machine learning application to determine the optimal length of time for the backup charging cycle and the backup energy delivery cycle. In other examples, a remote computing device can transmit the optimal length of time for the backup charging cycle and the backup energy delivery cycle to the battery management system 200.

In box 308, the thermal management application 300 determines the temperature of the main battery 209. The temperature sensor 218 can measure the temperature of the main battery 209 and provide temperature data to the controller 203. From the temperature data, the thermal management application 300 and/or the controller 203 can determine the temperature of the main battery 209 and/or a rate of temperature change for the main battery 209.

In box 311, the thermal management application 300 can determine whether the temperature or the rate of temperature change for the main battery 209 meets a threshold. For example, the thermal management application 300 can determine whether a temperature of 40° C. for the main battery 209 meets the temperature set point of 60° C. In this example, the present temperature does not meet or exceed the temperature set point. As such, the thermal management application 300 proceeds to box 308. In another example, the thermal management application 300 can determine that the rate of change for the main battery is one degree ° C. over a period of an hour. Similarly, the rate of change threshold may be set to ten degrees of change for an hour. As such, the thermal management application 300 proceeds to box 308. Alternatively, if the temperature or the rate of change exceeds the temperature set point or the rate of change threshold, then the thermal management application 300 proceeds to box 314.

In box 314, the thermal management application 300 can activate the backup charging cycle for a first time period. In the backup charging cycle, the thermal management application 300 can turn on the first switch (SWA) and keep the second switch (SWB) off. In this circuit configuration, the main battery 209 is charging the backup storage device 206. The battery current is higher than the load current $I_{Batt} > I_{Load}$ ($I_{Batt} = I_{Load} + I_1$). In some cases, the temperature of the main battery 209 may increase faster.

In box 317, the thermal management application 300 can determine whether the first time period has expired. If the first time period has not expired, then the thermal management application 300 proceeds back to the box 314. Alternatively, if the first time period has expired, the thermal management application 300 proceeds to box 320.

In box 320, the thermal management application 300 can activate the backup energy delivery cycle for a second time period. In the backup energy delivery cycle, the thermal management application 300 can turn off the first switch (SWA) and turn on the second switch (SWB). In this circuit configuration, the backup storage device 206 is providing current to the load 221, and the main battery 209 is providing current to the load 221. The battery current is lower than the load current $I_{Batt} < I_{Load}$ ($I_{Batt} = I_{Load} - I_2$) and the temperature increases slower or even drops. The controller 203 can manage the current for charging the main battery 209.

Figure 4A:
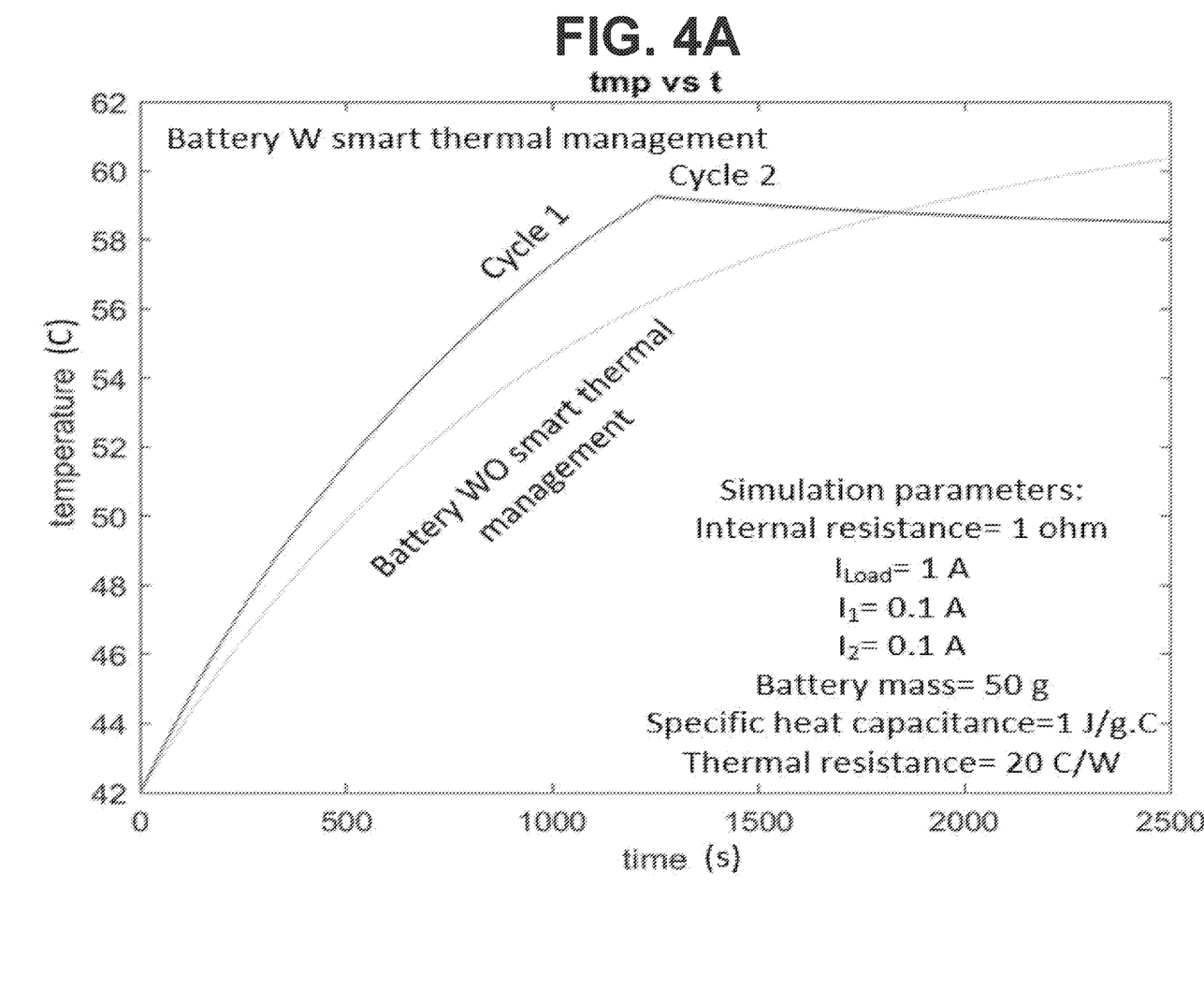
FIGS. 4A-4C are simulation graphs of a battery without a thermal management system and a battery with a thermal management system, according to one embodiment described herein.
Figure 4B:
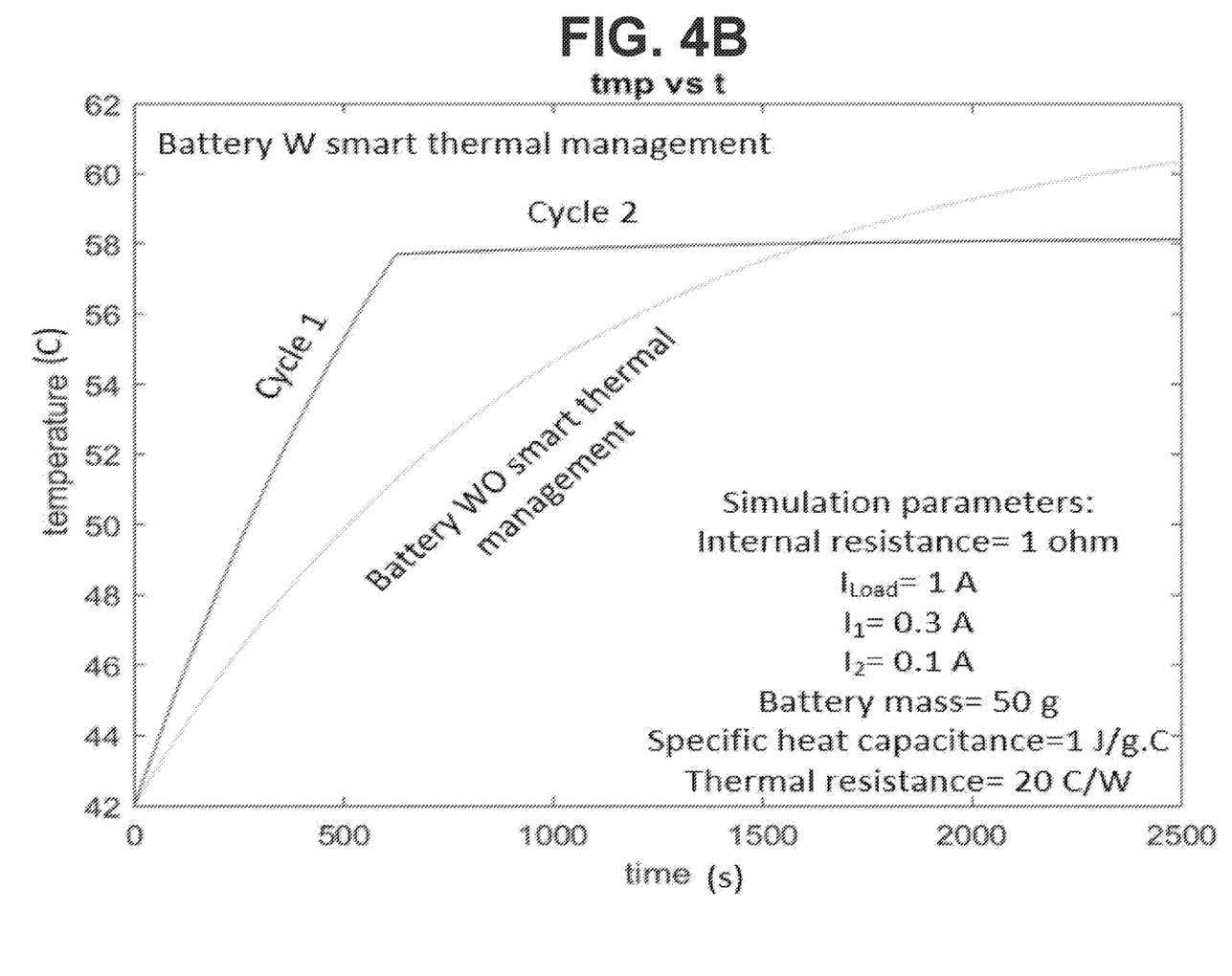
Figure 4C:
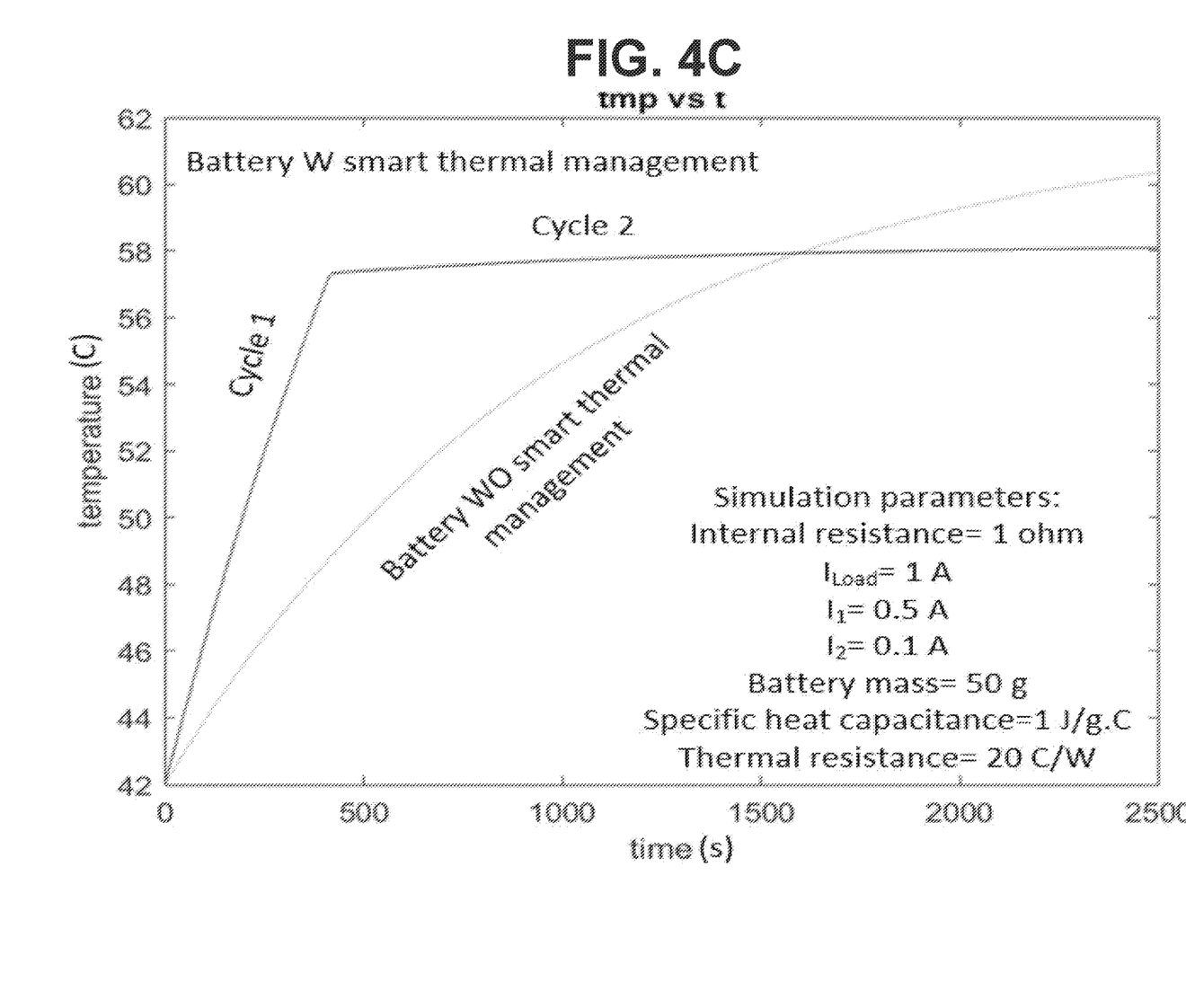

With reference to FIGS. 4A-4C, shown are simulation graphs of a battery without a thermal management system and a battery with a thermal management system. The simulation graphs show that controlling the cycles for the combination of the main battery and the backup storage can result in lower overall temperature in an extended time of using the battery at a high level of current.

According to various embodiments, the battery management system 200 can include a backup energy storage. The backup energy storage can be used to avoid thermal runaway in rechargeable batteries. The backup energy storage can be a rechargeable battery or a supercapacitor. The battery management system 200 can include a controller 203 and the controller 203 can comprise one or multiple temperature sensors for measuring the main battery temperature. The controller can also include a first current sensor to measure a first current from the main battery and a second current sensor to measure a second current supplied to the load. The controller can also include a first programmable/self-adjusted current source and a second programmable/self-adjusted current source. The two programmable/self-adjusted current sources can be used to charge the backup storage and recover energy from the backup storage.

The controller 203 can include one or more sensors for measuring the state of charge in the main battery 209 and the backup storage device 206. The controller 203 can be used to operate one or more switches for configuring the battery management system 200 for charging the backup storage device 206 or delivering the energy from the backup storage to the load 221 in parallel with the main battery 209. The controller 203 can be configured to repeat the backup charging cycle and the backup delivery energy cycle multiple times in order to control the temperature of the main battery 209.

The controller 203 can be configured to protect the main battery 209 both during the backup storage charge cycle and the backup storage device 206 delivering energy cycle. The combination of two cycles controls the rate of temperature raise in the main battery via lowering the supply current in the second cycle.

The controller 203 can be electrically coupled to a DC-DC converter at its output to match the voltage at its output to the load voltage. As such, the DC-DC converter receives a first voltage output from the battery management system 200 and converts the first voltage to a second voltage, which in turn is provided to the load 221. Additionally, the controller 203 can be electrically coupled to a DC-AC converter at its output for a direct connection to AC loads. As such, the DC-AC converter receives a DC voltage output from the battery management system 200 and converts the DC voltage to an AC voltage, which in turn is provided to the load 221.

Thus, the present invention provides systems and methods for managing the temperature rise in batteries to avoid thermal runaway by way of using a supercapacitor or a backup battery.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in one embodiment", "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise.

Although the invention has been described in considerable detail with reference to certain embodiments, one skilled in the art will appreciate that the present invention can be used in alternative embodiments to those described, which have been presented for purposes of illustration and not of limitation. For instance, the piezoelectric film can be coated on a metal anode surface instead of on the separator surface. Therefore, the scope of the appended claims should not be limited to the description of the embodiments contained herein.

What is claimed is:

1. A battery management system, comprising:
    a first circuit path electrically coupling a battery and a load;
    a backup storage device;
    a second circuit path electrically coupling the battery and the backup storage device;
    a first switch connected in the second circuit path between the battery and the backup storage device;
    a third circuit path electrically coupling the backup storage device and the load;
    a second switch connected in the third circuit path between the backup storage device and the load;
    a sensor for measuring a temperature of the battery; and
    a controller in electrical communication with the first switch, the second switch, and the sensor, the controller executing a program stored in the controller to:
        (i) activate the first switch to connect the battery and the backup storage device for charging the backup storage device for a charging period of time with power provided by the battery based at least in part on the temperature of the battery meeting a threshold, and
        (ii) activate the second switch to connect the backup storage device and the load for providing power to the load from the backup storage device after the charging period of time has expired.

2. The battery management system of claim 1, wherein the backup storage device provides the power to the load in parallel with the battery when the second switch is activated.

3. The battery management system of claim 1, wherein the backup storage device comprises a supercapacitor.

4. The battery management system of claim 1, wherein the backup storage device comprises a rechargeable battery.

5. The battery management system of claim 1, wherein the threshold comprises a temperature set point.

6. The battery management system of claim 5, wherein the temperature set point is less than a thermal runaway temperature for the battery.

7. The battery management system of claim 5, wherein the temperature set point is a percentage less than a thermal runaway temperature for the battery.

8. The battery management system of claim 1, wherein the threshold comprises a rate of temperature change.

9. The battery management system of claim 7, wherein the rate of temperature change is a predetermined rate of temperature change that causes a thermal runaway temperature for the battery.

10. The battery management system of claim 1, wherein there is no switch in the first circuit path electrically coupling the battery and the load.

11. The battery management system of claim 1, wherein the controller executes the program stored in the controller to deactivate the first switch to disconnect the battery and the backup storage device and to deactivate the second switch to disconnect the backup storage device and the load before charging the backup storage device for the charging period of time.

12. The battery management system of claim 1, wherein the controller executes the program stored in the controller to deactivate the first switch to disconnect the battery and the backup storage device before activating the second switch to connect the backup storage device and the load.

13. The battery management system of claim 12, wherein the controller executes the program stored in the controller to:
  (iii) deactivate the second switch to disconnect the backup storage device and the load after an energy delivery period of time.

14. The battery management system of claim 13, wherein the controller executes the program stored in the controller to receive from a remote computing device the charging period of time and the energy delivery period of time.

15. The battery management system of claim 13, a first current from the battery during the charging period of time is higher than a second current from the battery during the energy delivery period of time.

16. The battery management system of claim 1, wherein the controller executes the program stored in the controller to use a machine learning application to determine an optimal length of time for the charging period of time.

17. The battery management system of claim 1, further comprising a DC-DC converter for converting a first voltage output from the battery management system to a second voltage provided to the load.

18. The battery management system of claim 1, further comprising a DC-AC converter for receiving a DC voltage output from the battery management system and converting the DC voltage to an AC voltage provided to the load.

19. The battery management system of claim 1, further comprising a sensor for measuring a state of charge in the battery.

20. The battery management system of claim 1, further comprising a sensor for measuring a state of charge in the backup storage device.

21. A battery management system, comprising:
  a first circuit path electrically coupling a battery and a load;
  a backup storage device;
  a second circuit path electrically coupling the battery and the backup storage device;
  a first switch connected in the second circuit path between the battery and the backup storage device;
  a third circuit path electrically coupling the backup storage device and the load;
  a second switch connected in the third circuit path between the backup storage device and the load;
  a sensor for measuring a battery current in the first circuit path; and
  a controller in electrical communication with the first switch, the second switch, and the sensor, the controller executing a program stored in the controller to:
    (i) activate the first switch to connect the battery and the backup storage device for charging the backup storage device for a charging period of time with power provided by the battery based at least in part on the battery current meeting a threshold, and
    (ii) activate the second switch to connect the backup storage device and the load for providing power to the load from the backup storage device after the charging period of time has expired.

22. The battery management system of claim 1, wherein the backup storage device provides the power to the load in parallel with the battery when the second switch is activated.

23. The battery management system of claim 21, wherein the backup storage device comprises a supercapacitor.

24. The battery management system of claim 21, wherein the backup storage device comprises a rechargeable battery.

25. The battery management system of claim 21, wherein the controller executes the program stored in the controller to determine a temperature of the battery based on the battery current.

26. The battery management system of claim 25, wherein the threshold corresponds to a temperature set point.

27. The battery management system of claim 26, wherein the temperature set point is less than a thermal runaway temperature for the battery.

28. The battery management system of claim 26, wherein the temperature set point is a percentage less than a thermal runaway temperature for the battery.

29. The battery management system of claim 21, wherein there is no switch in the first circuit path electrically coupling the battery and the load.

30. The battery management system of claim 21, wherein the controller executes the program stored in the controller to deactivate the first switch to disconnect the battery and the backup storage device and to deactivate the second switch to disconnect the backup storage device and the load before charging the backup storage device for the charging period of time.

31. The battery management system of claim 21, wherein the controller executes the program stored in the controller to deactivate the first switch to disconnect the battery and the backup storage device before activating the second switch to connect the backup storage device and the load.

32. The battery management system of claim 31, wherein the controller executes the program stored in the controller to:
  (iii) deactivate the second switch to disconnect the backup storage device and the load after an energy delivery period of time.

33. The battery management system of claim 32, wherein the controller executes the program stored in the controller to receive from a remote computing device the charging period of time and the energy delivery period of time.

34. The battery management system of claim 32, a first current from the battery during the charging period of time is higher than a second current from the battery during the energy delivery period of time.

35. The battery management system of claim 21, wherein the controller executes the program stored in the controller to use a machine learning application to determine an optimal length of time for the charging period of time.

36. The battery management system of claim 21, further comprising a DC-DC converter for converting a first voltage output from the battery management system to a second voltage provided to the load.

37. The battery management system of claim 21, further comprising a DC-AC converter for receiving a DC voltage output from the battery management system and converting the DC voltage to an AC voltage provided to the load.

38. The battery management system of claim 21, further comprising a sensor for measuring a state of charge in the battery.

39. The battery management system of claim 21, further comprising a sensor for measuring a state of charge in the backup storage device.

40. A method for operating a battery management system, the method comprising:
  determining, via a controller, that a temperature of a battery has met a temperature threshold based at least in part on sensor data received from a sensor measuring a battery characteristic, wherein the battery provides power to a load;

activating, via the controller, a charging cycle for a backup storage device based at least in part on the temperature of the battery meeting the temperature threshold, wherein the battery charges the backup storage device;

determining, via the controller, that a first time period has expired for the charging cycle; and activating, via the controller, a delivery cycle in which the backup storage device provides power to the load in parallel to the battery with respect to the battery.

41. The method of claim 40, wherein activating the charging cycle further comprises activating a circuit switch for the battery to provide power to the backup storage device.

42. The method of claim 41, wherein the circuit switch is a first circuit switch, and activating the charging cycle further comprises deactivating a second circuit switch.

43. The method of claim 42, wherein activating, via the controller, the delivery cycle in which the backup storage device provides power to the load in parallel to the battery further comprises deactivating the first circuit switch.

44. The method of claim 40, wherein the sensor comprises a temperature sensor.

45. The method of claim 40, wherein the sensor comprises a current sensor, and the battery characteristic is a battery current supplied by the battery.

46. The method of claim 40, wherein the backup storage device comprises a rechargeable battery.

47. The method of claim 40, wherein the backup storage device comprises a supercapacitor.

* * * * *